United States Patent
Jeong

(10) Patent No.: US 11,212,132 B2
(45) Date of Patent: Dec. 28, 2021

(54) METHOD FOR PROVIDING IOT DEVICE INFORMATION, APPARATUS AND INTELLIGENT COMPUTING DEVICE THEREOF

(71) Applicant: LG ELECTRONICS INC., Seoul (KR)

(72) Inventor: Jangkeun Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 16/691,548

(22) Filed: Nov. 21, 2019

(65) Prior Publication Data
US 2020/0092124 A1   Mar. 19, 2020

(30) Foreign Application Priority Data

Jul. 23, 2019   (KR) ........................ 10-2019-0088834

(51) Int. Cl.
| | |
|---|---|
| *H04L 12/28* | (2006.01) |
| *G06N 3/08* | (2006.01) |
| *H04W 72/04* | (2009.01) |
| *H04W 56/00* | (2009.01) |
| *G06T 7/73* | (2017.01) |
| *G06K 9/00* | (2006.01) |

(52) U.S. Cl.
CPC ...... *H04L 12/2812* (2013.01); *G06K 9/00671* (2013.01); *G06N 3/08* (2013.01); *G06T 7/74* (2017.01); *H04L 12/2809* (2013.01); *H04L 12/2814* (2013.01); *H04L 12/2821* (2013.01); *H04L 12/2827* (2013.01); *H04W 56/006* (2013.01); *H04W 72/042* (2013.01)

(58) Field of Classification Search
CPC ..... H04L 67/18; H04L 12/2807; H04L 67/12; H04L 67/303; H04W 4/023; H04W 4/029; H04W 4/33; H04W 4/70; H04W 4/80; H04W 64/00; H04W 84/18; H04W 8/22; H04W 4/02; H04W 64/006
See application file for complete search history.

(56) References Cited

U.S. PATENT DOCUMENTS

| | | | |
|---|---|---|---|
| 9,000,896 B1 * | 4/2015 | Kim ...................... | H04L 41/082 340/10.5 |
| 9,569,736 B1 * | 2/2017 | Ghesu ................... | A61B 6/032 |
| | (Continued) | | |

FOREIGN PATENT DOCUMENTS

WO   WO-2019109290 A1 *   6/2019   .......... G06N 3/0481

*Primary Examiner* — Ario Etienne
*Assistant Examiner* — Kidest Mendaye
(74) *Attorney, Agent, or Firm* — Lee Hong Degerman Kang & Waimey

(57) ABSTRACT

Provided are a method and device for providing IoT device information and an intelligent computing device. A method of providing information related to a control target device includes searching for the control target device and displaying a position of the control target device in a map of an area in which the control target device is positioned. Therefore, an intuitive interface can be provided to a user. One or more of the IoT devices, robots, and intelligent computing devices of the present disclosure may comprise artificial intelligence modules, drones (Unmanned Aerial Vehicles, UAVs), robots, Augmented Reality (AR) devices, virtual reality, VR) devices, devices related to 5G services, and the like.

12 Claims, 10 Drawing Sheets

(56) References Cited

U.S. PATENT DOCUMENTS

| | | | |
|---|---|---|---|
| 2015/0358777 A1* | 12/2015 | Gupta | H04L 67/18 |
| | | | 370/254 |
| 2017/0034468 A1* | 2/2017 | Won | H04N 5/23293 |
| 2018/0154514 A1* | 6/2018 | Angle | G16H 20/13 |
| 2018/0292827 A1* | 10/2018 | Artes | G05D 1/0088 |
| 2019/0044826 A1* | 2/2019 | Flores Guerra | H04L 41/22 |
| 2019/0202062 A1* | 7/2019 | Park | B25J 19/023 |
| 2020/0037293 A1* | 1/2020 | Reial | H04W 48/08 |
| 2020/0413481 A1* | 12/2020 | Shemer | H04W 4/027 |

* cited by examiner

[FIG. 3]
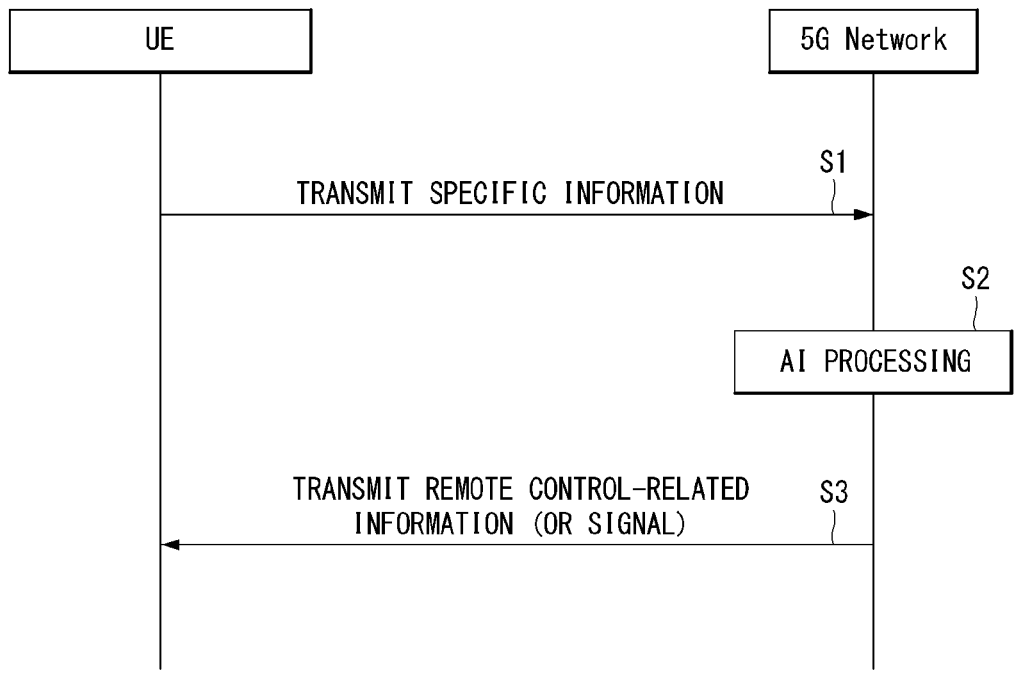

[FIG. 4]
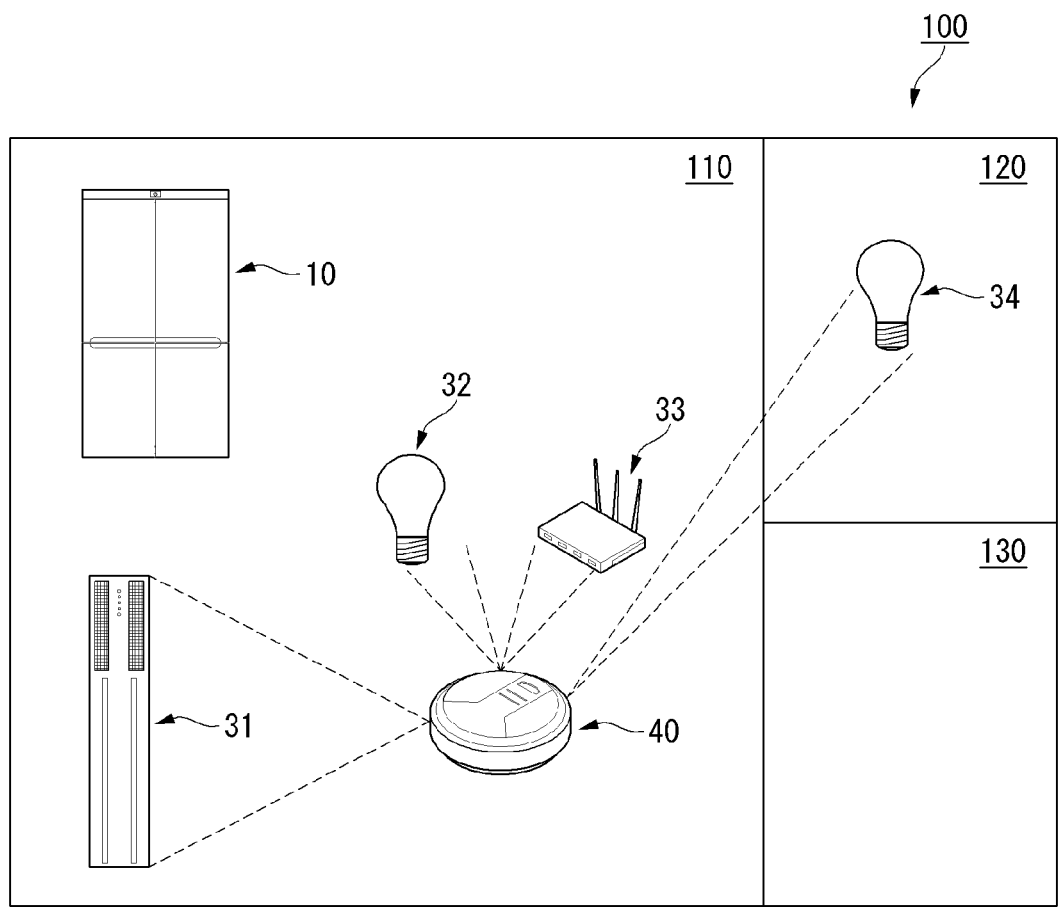

[FIG. 5]
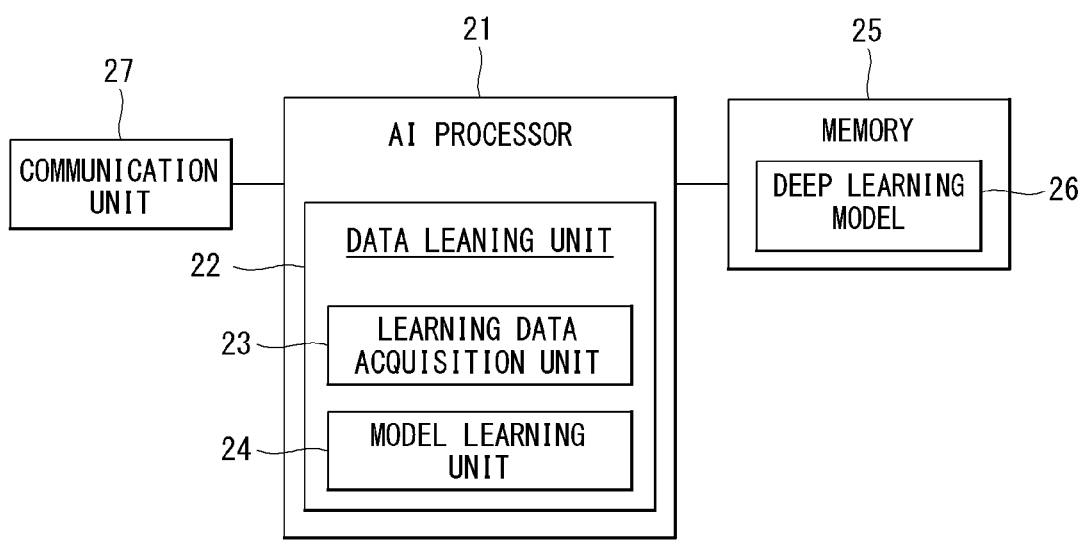

[FIG. 6]
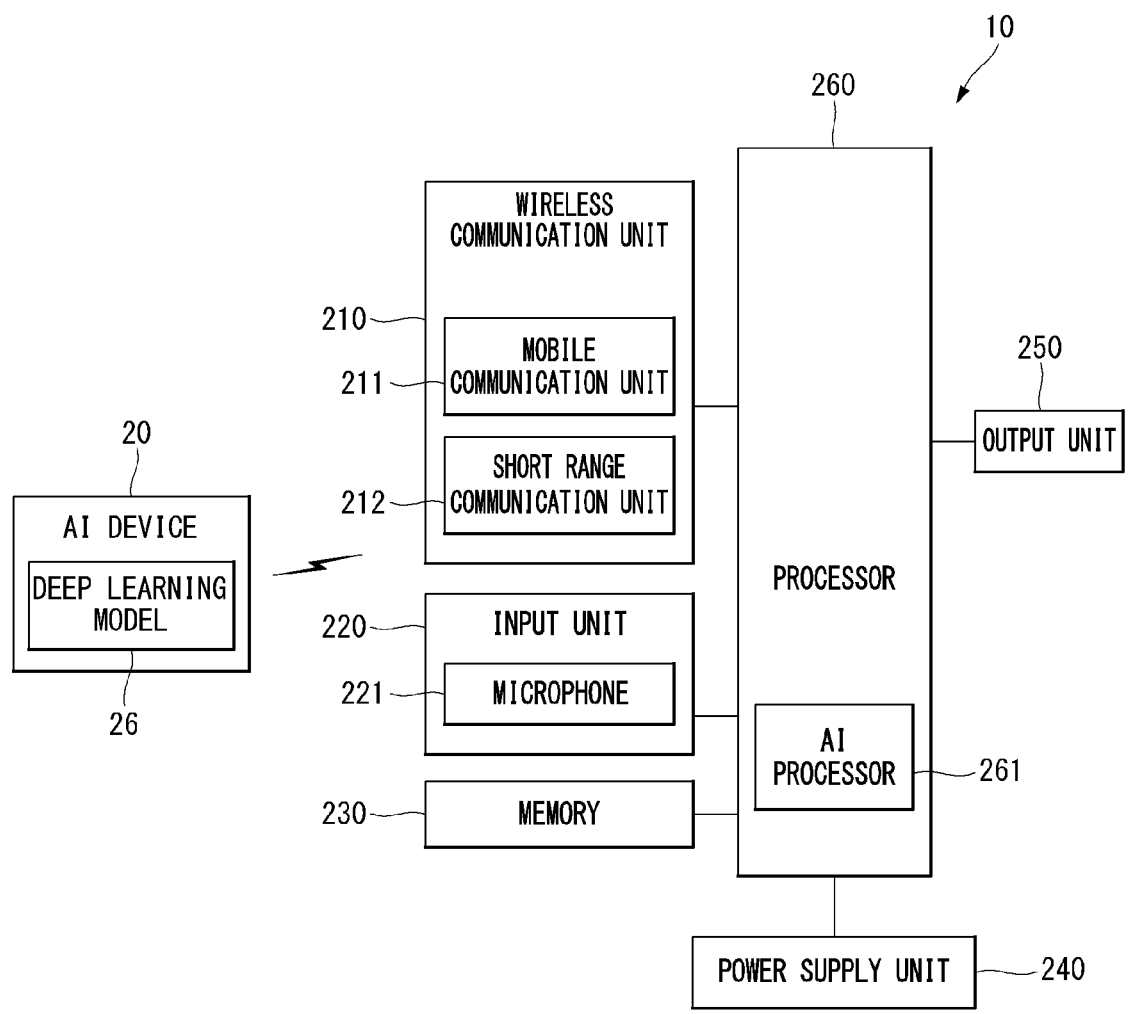

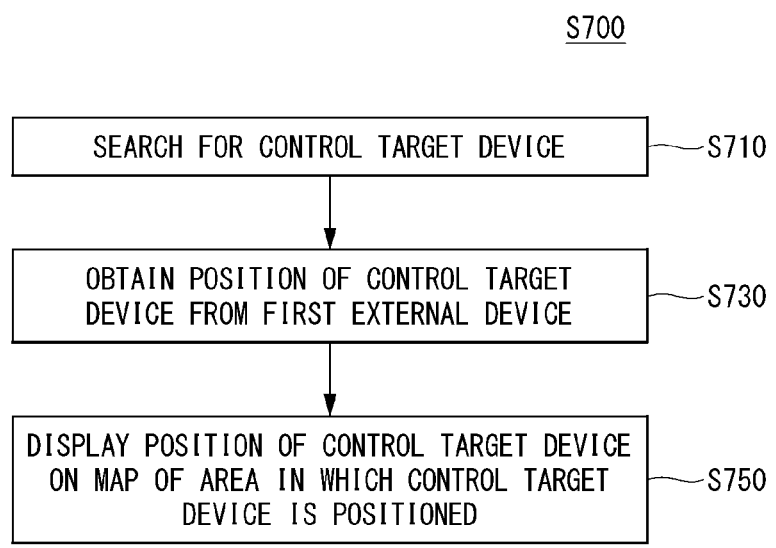
[FIG. 7]

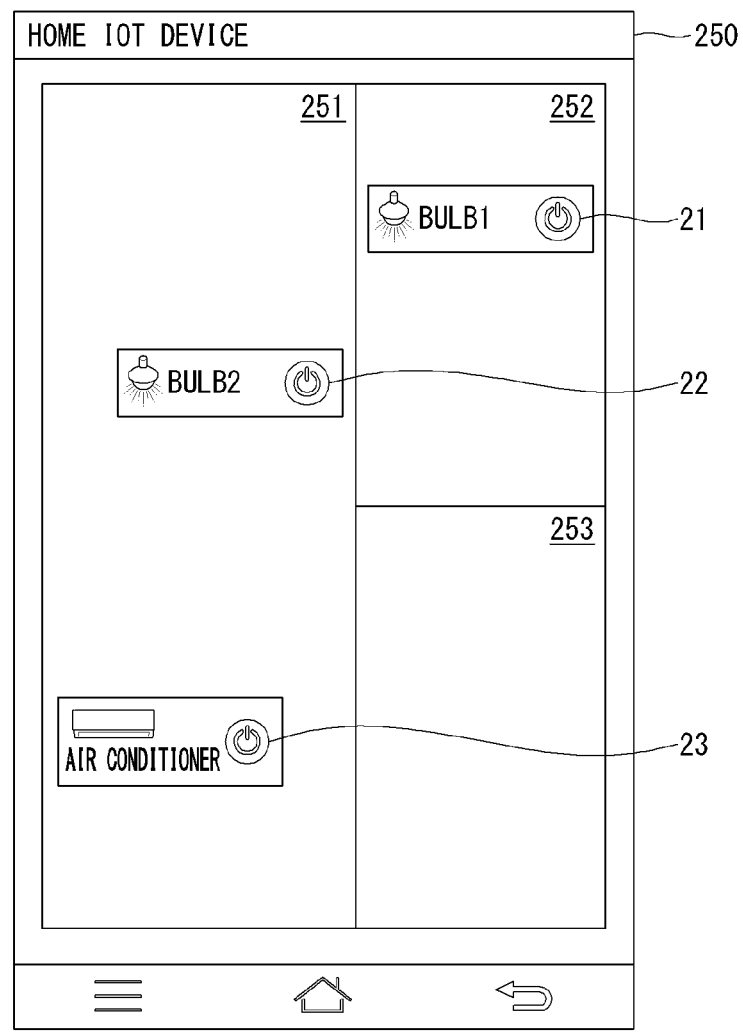

[FIG. 9]
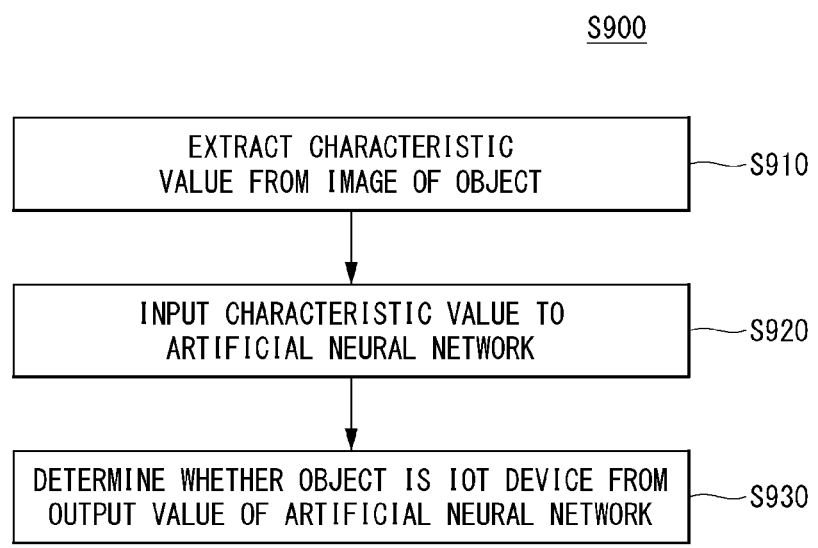

[FIG. 10]
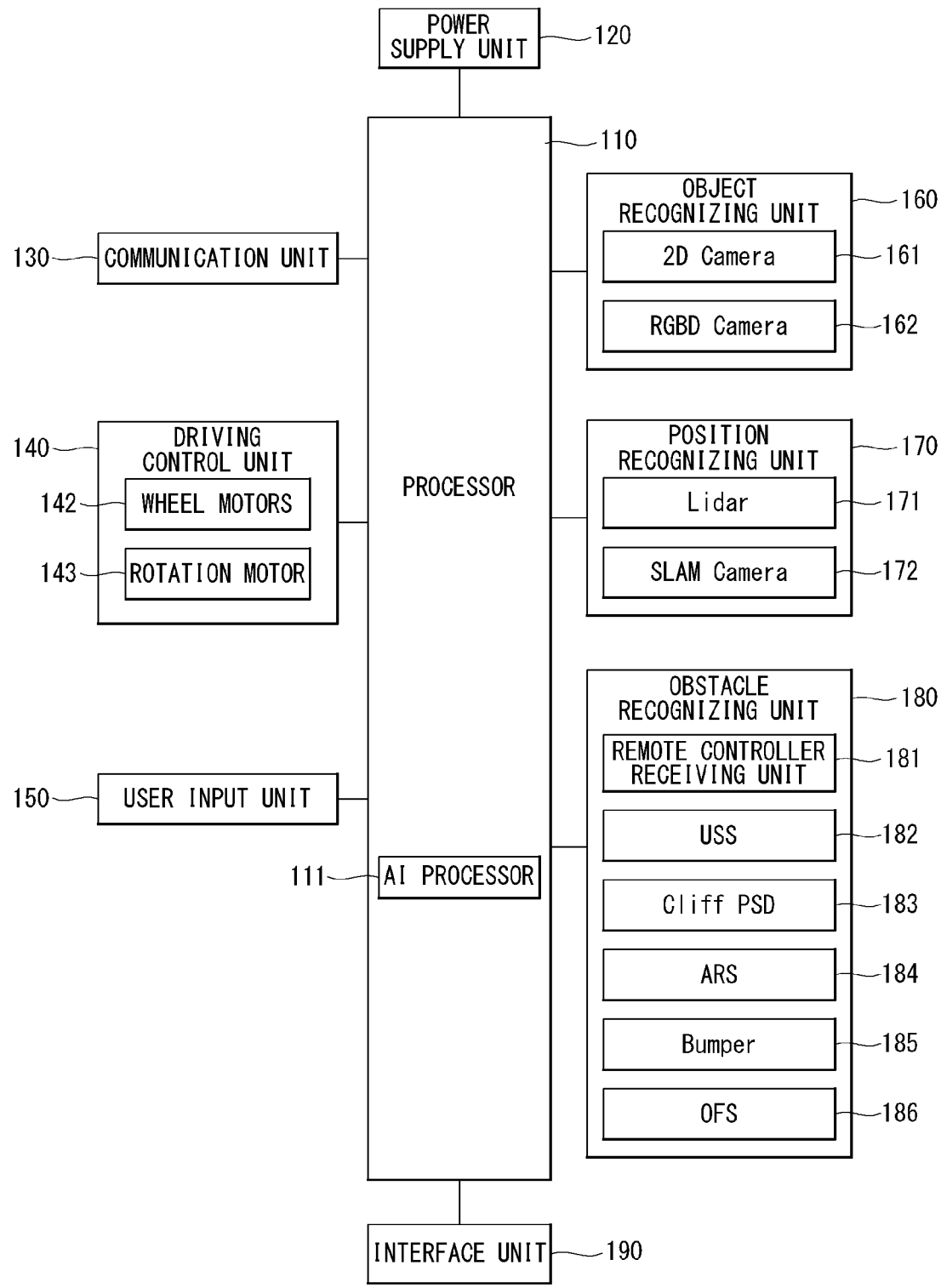

METHOD FOR PROVIDING IOT DEVICE
INFORMATION, APPARATUS AND
INTELLIGENT COMPUTING DEVICE
THEREOF

CROSS-REFERENCE TO RELATED
APPLICATION(S)

Pursuant to 35 U.S.C. § 119(a), this application claims the benefit of earlier filing date and right of priority to Korean Patent Application No. 10-2019-0088834, filed on Jul. 23, 2019, the contents of which are all hereby incorporated by reference herein in its entirety.

BACKGROUND OF THE INVENTION

Field of the Invention

The present disclosure relates to a method and device for providing IoT device information and an intelligent computing device, and more particularly, to a method and device for providing IoT device information and an intelligent computing device that can provide intuitive device information to a user.

Related Art

Recently, with the development of 5G communication technology and Internet of Things (IoT) service, IoT technology for controlling IoT devices, to which artificial intelligence is applied, communicating with each other in a user's home is emerging.

In particular, the IoT device communicates with another IoT device through a 5G network and thus one IoT device may wirelessly control another IoT device.

The user may view a list of IoT devices connected to a wireless network (e.g., Wireless LAN, W-LAN) through a main IoT device (or IoT hub) or an IoT terminal in the form of a text.

However, the user may simply know a list of connected devices, but may not know a position in which the respective devices are positioned in a home.

SUMMARY OF THE INVENTION

An object of the present disclosure is to meet the needs and solve the problems.

Further, the present disclosure provides a method and device for intelligently providing position information of an IoT device, and an intelligent computing device.

In an aspect, a method of providing information related to a control target device includes searching for the control target device; and displaying information related to the found control target device, wherein the information related to the control target device includes a position of the control target device in a map of an area in which the control target device is positioned.

The displaying of information may include obtaining a map of an area in which the control target device is positioned and a position of the control target device from an external device.

The displaying of information may include determining whether an object is a control target device; and requesting, if an object is a control target device, information related to a position of the object to the external device.

The determining of whether an object is a control target device may include transmitting a reference control signal to the object; obtaining information related to a response result of the object, having received the reference control signal from the external device; and determining whether the object is the control target device based on the response result.

The reference control signal may include a control signal that controls to turn on/off the control target device.

The determining of whether an object is a control target device may include obtaining a photographed image of the object from the external device; and determining whether the object is the control target device based on the photographed image of the object.

The method may further include extracting a characteristic value from a photographed image of the object; inputting the characteristic value to a previously learned artificial neural network; obtaining a probability that the object is the control target device from the previously learned artificial neural network; and determining whether the object is the control target device based on the probability.

The method may further include receiving Downlink Control Information (DCI) used for scheduling reception of a position of the control target device from the network and receiving a position of the control target device from an external device through the network based on the DCI.

The method may further include performing an initial access procedure to the network based on a synchronization signal block (SSB) and receiving a position of the control target device from the external device through a Physical Uplink Shared Channel (PUSCH) and the network, wherein a DM-RS of the PUSCH and the SSB may be quasi co-located (QCL) for QCL type D.

The method may further include controlling a communication unit to transmit a photographed image of an object to an AI processor included in the network and controlling the communication unit to receive AI processed information from the AI processor, wherein the AI processed information may be a probability that the photographed object is the control target device.

In another aspect, a device information providing device for providing information related to a control target device includes a display unit; a communication unit for searching for the control target device; and a processor for displaying information related to the found control target device through the display unit, wherein the information related to the control target device includes a position of the control target device in a map of an area in which the control target device is positioned.

The processor may obtain a map of an area in which the control target device is positioned and a position of the control target device from an external device.

The processor may determine whether an object is a control target device, and if an object is a control target device, the processor may request information related to a position of the object to the external device.

When determining whether the object is a control target device, the processor may transmit a reference control signal to the object, obtain information related to a response result of the object, having received the reference control signal from the external device, and determine whether the object is the control target device based on the response result.

The reference control signal may include a control signal that controls to turn on/off the control target device.

When determining whether the object is a control target device, the processor may obtain a photographed image of the object from the external device and determine whether the object is the control target device based on the photographed image of the object.

The processor may extract a characteristic value from a photographed image of the object, input the characteristic value to a previously learned artificial neural network, obtain a probability that the object is the control target device from the previously learned artificial neural network, and determine whether the object is the control target device based on the probability.

The processor may control the communication unit to receive Downlink Control Information (DCI) used for scheduling reception of a position of the control target device from the network and to receive a position of the control target device from an external device through the network based on the DCI.

The processor may control the communication unit to perform an initial access procedure to the network based on synchronization signal block (SSB) and to receive a position of the control target device from the external device through a PUSCH and the network, wherein a DM-RS of the PUSCH and the SSB may be QCL for QCL type D.

The processor may control the communication unit to transmit a photographed image of an object to an AI processor included in the network and to receive AI processed information from the AI processor, wherein the AI processed information may be a probability that the photographed object is the control target device.

In another aspect, a non-transient computer readable recording medium is a non-transitory computer-executable component that stores a computer executable component configured to execute in at least one processor of a computing device, searches for a control target device and displays information related to the found control target device, and the information related to the control target device includes a position of the control target device in a map of an area in which the control target device is positioned.

BRIEF DESCRIPTION OF THE DRAWINGS

The accompanying drawings, included as part of the detailed description in order to provide a thorough understanding of the present disclosure, provide embodiments of the present disclosure and together with the description, describe the technical features of the present disclosure.

FIG. 3 shows an example of basic operations of an user equipment and a 5G network in a 5G communication system.

FIG. 4 illustrates an IoT system according to an embodiment of the present disclosure.

FIG. 5 is a block diagram of an AI device according to an embodiment of the present disclosure.

FIG. 6 shows a diagram illustrating an AI device associated with a device information providing device according to an embodiment of the present disclosure.

FIG. 7 is a flowchart illustrating a method of providing device information according to an embodiment of the present disclosure.

FIG. 8 illustrates an example in which a device information providing device displays a position of each IoT device.

FIG. 9 is a flowchart illustrating a method of recognizing an IoT device according to an embodiment of the present disclosure.

FIG. 10 is a block diagram illustrating a device information acquisition device (robot device) according to an embodiment of the present disclosure.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
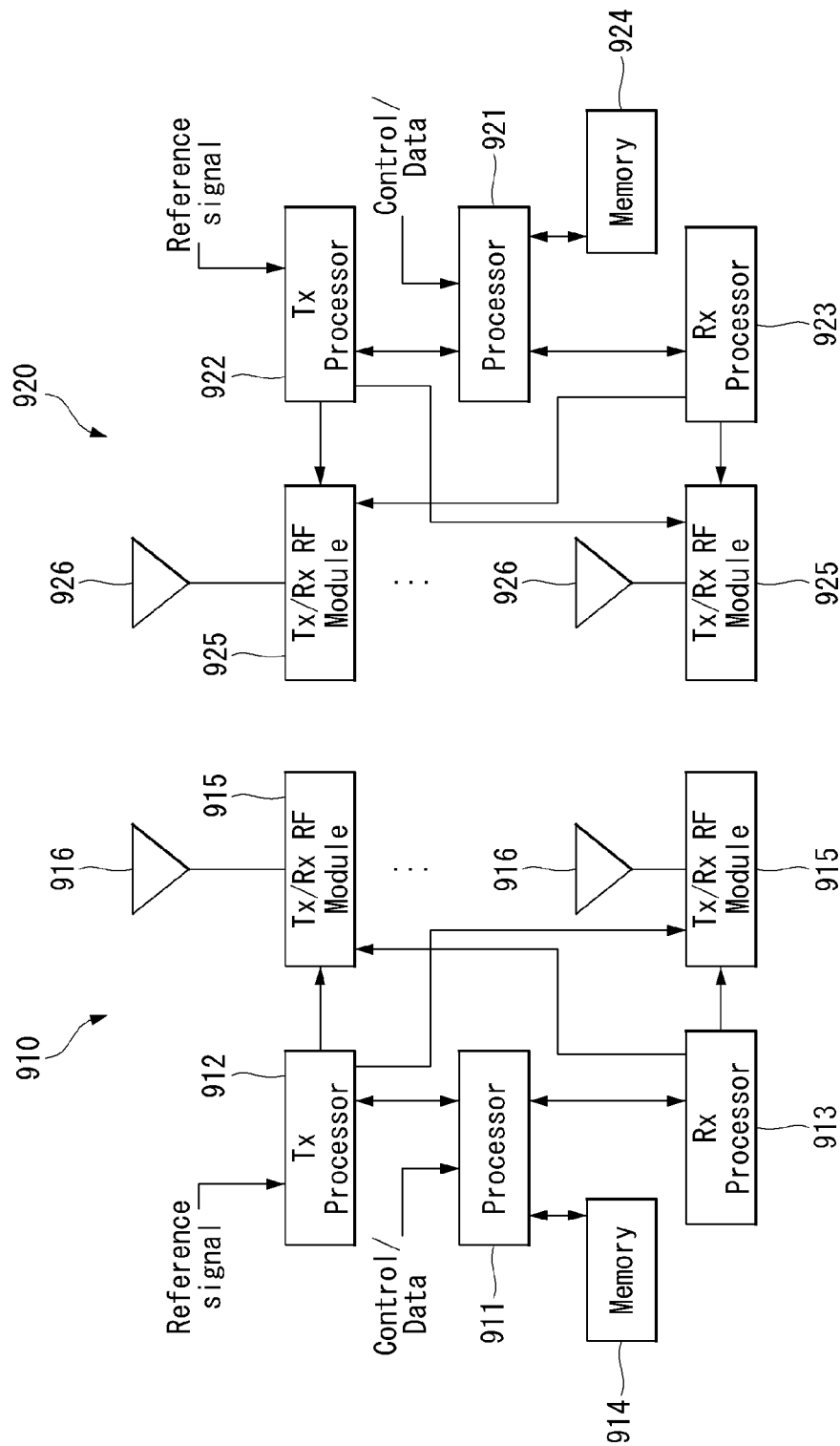
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
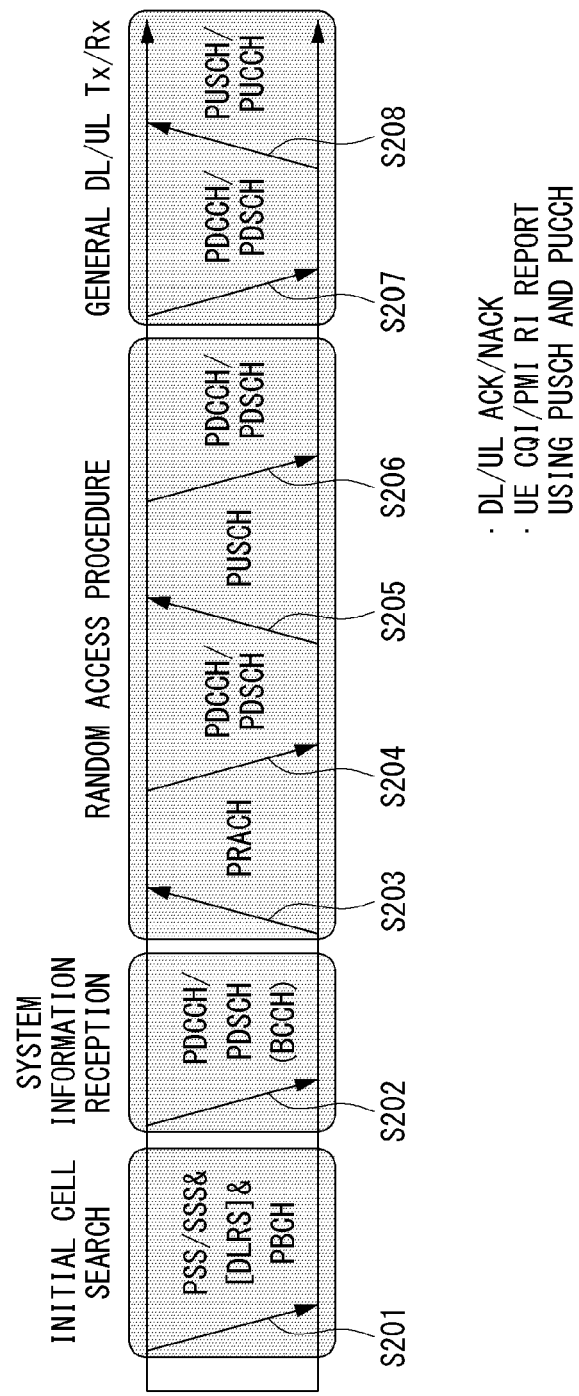
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequential ly described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 illustrates an IoT system according to an embodiment of the present disclosure.

As shown in FIG. 4, according to the embodiment of the present disclosure, an IoT system 100 may include a plurality of IoT devices 31, 32, 33, and 34, a device information acquisition device 40, and a device information providing device 10.

The device information providing device 10 may form a wired/wireless communication network with the plurality of IoT devices 31, 32, 33, and 34 and transmit and receive data through the wired/wireless communication network.

The device information acquisition device 40 may be a mobile robot that can freely move within a home in which the IoT system 100 is positioned.

Here, the device information providing device 10 may obtain information about each of the IoT devices 31, 32, 33, and 34 from the device information acquisition device 40. For example, the information about each of the IoT devices 31, 32, 33, and 34 may include information about a position of each IoT device. Further, the information about each of the IoT devices 31, 32, 33, and 34 may include photographed information of each IoT device.

Here, the plurality of IoT devices 31, 32, 33, and 34 may be connected through a 5G network. For example, the plurality of IoT devices 31, 32, 33, and 34 may be connected through an IoT service.

Here, the plurality of IoT devices 31, 32, 33, and 34 may be included in a single wireless LAN network and perform WiFi communication between respective devices.

In an embodiment of the present disclosure, the device information providing device 10 may display position information of each of the IoT devices 31, 32, 33, and 34 based on position information of each of the IoT devices 31, 32, 33, and 34 positioned in a home.

FIG. 5 is a block diagram of an AI device according to an embodiment of the present disclosure.

The AI device 20 may include an electronic device having an AI module capable of AI processing, a server including the AI module, or the like. Moreover, the AI device 20 may be included in the device 10 shown in FIG. 5 as a least a part and provided to execute at least a portion of the AI processing together.

The AI processing may include all operations related to device information provision of the device information providing device 10 of FIG. 5. For example, the AI processing may be a process of analyzing an image of each of the IoT devices 31, 32, 33, and 34 photographed by the device information acquisition device 40 and obtaining information for determining whether each IoT device is an IoT device.

The AI device 20 may include an AI processor 21, a memory 25, and/or a communication unit 27. The AI device 20 is a computing device capable of learning a neutral network and may be implemented as various electronic devices such as a server, a desktop PC, a notebook PC, or a tablet PC.

The AI processor 21 may learn the neutral network using a program stored in the memory 25. In particular, the AI processor 21 may learn a neural network for analyzing an image of an object to recognize whether each object is an IoT device. Here, the neutral network for recognizing the device-related data may be designed to simulate a human brain on a computer and may include a plurality of weighted network nodes which simulate neurons of a human neutral network.

The plurality of network modes may transmit and receive data according to a connection relationship so that the neurons simulate synaptic activity of the neurons that send and receive signals through synapses. Here, the neutral network may include a deep-learning model developed from a neutral network model. In the deep-learning model, the plurality of network nodes may be located at different layers and may transmit or receive data according to a convolutional connection relationship. An example of the neutral network model includes various deep-learning techniques such as deep neutral networks (DNN), convolutional deep neutral networks (CNN), a Recurrent Boltzmann Machine (RNN), a Restricted Boltzmann Machine (RBM), deep belief networks (DBN), or a Deep Q-Network, and may be applied to a computer vision, voice recognition, natural language processing, voice/signal processing, or the like.

Meanwhile, the processor which performs the above-described function may be a general purpose processor (for example, CPU), but may be an AI dedicated processor (for example, a GPU) for artificial intelligence learning.

The memory 25 may store various programs and data necessary for an operation of the AI device 20. The memory 25 may be implemented as a nonvolatile memory, a volatile memory, a flash memory, a hard disk drive (HDD), a solid state drive (SDD), or the like. The memory 25 is accessed by the AI processor 21, and reading/writing/modifying/deleting/update of data by the AI processor 21 may be executed. In addition, the memory 25 may store a neutral network model (for example, a deep-learning model 26) generated through a learning algorithm for classification/recognition of data according to an embodiment of the present disclosure.

Meanwhile, the AI processor 21 may include a data learning unit 22 which learns a neutral network for classifying/recognizing data. The data learning unit 22 can learn a criteria as to which learning data to use to determine classification/recognition of the data, and can learn a criteria about how to classify and recognize data using learning data. The data learning unit 22 may learn the deep-learning model by acquiring the learning data to be used for learning and applying the acquired learning data to the deep-learning model.

The data learning unit 22 may be manufactured in a form of at least one hardware chip and mounted on the AI device 20. For example, the data learning unit 22 may be manufactured in a form of a dedicated hardware chip for artificial intelligence (AI), or may be manufactured as a portion of a general purpose processor (CPU) or a graphic dedicated processor (GPU) and mounted on the AI device 20. In addition, the data learning unit 22 may be implemented as a software module.

The data learning unit 22 is implemented as a software module (or program module including instruction), the software module may be stored in a computer readable non-transitory computer readable media. In this case, at least one software module may be provided by an operating system (OS) or may be provided by an application.

The data learning unit 22 may include a learning data acquisition unit 23 and a model learning unit 24.

The learning data acquisition unit 23 can acquire learning data required for the neutral network model to classify and recognize data. For example, the learning data acquisition unit 23 may obtain an image of the IoT device for inputting to a neural network model as learning data.

The model learning unit 24 may learn using the acquired learning data so that the neutral network model has a determination criteria about how to classify predetermined data. In this case, the model learning unit 24 can cause the neutral network model to learn, through supervised learning using at least a portion of the learning data as the determination criteria. Alternatively, the model learning unit 24 self-learns using the learning data without guidance, and thus, can cause the neutral network model to learn through unsupervised learning finding the determination criteria. Moreover, the model learning unit 24 can cause the neutral work model to learn, through reinforcement learning using a feedback which determines whether a result of a situation determination according to the learning is correct. In addition, the model learning unit 24 can cause the neutral network to learn, using a learning algorithm including error back-propagation or gradient decent.

If the neutral network model is learned, the model learning unit 24 can store the learned neutral network model in a memory. The model learning unit 24 may store the learned neutral network model in a memory of a server connected to the AI device 20 in a wire network or a wireless network.

The data learning unit 22 may further include a learning data preprocessor (not shown) and a learning data selector (not shown) so as to improve an analysis result of a recognition model or save a resource or time required for generating the recognition model.

The learning data preprocessor may preprocess the acquired data so that the acquired data may be used in learning for determining a situation. For example, the learning data preprocessor may process the acquired data into a preset format so that the model learning unit 24 can use the learning data acquired for learning to recognize an image.

Moreover, the learning data selector may select data required for the learning of the learning data acquired by the learning data acquisition unit 23 and the learning data preprocessed by the preprocessor. The selected learning data may be provided to the model learning unit 24. For example, by detecting a specific area of a characteristic value of a message obtained from the device information providing device 10, the learning data selection unit may select only data of syllables included in the specific area as learning data.

In addition, the data learning unit 22 may further include a model evaluator (not shown) to improve the analysis result of the neutral network model.

The model evaluator may input evaluation data into the neutral network model, and allow the model learning unit 24 to relearn when the analysis result output from the evaluation data does not satisfy a predetermined criteria. In this case, the evaluation data may be predefined data for evaluating the recognition model. For example, the model evaluator may evaluate that the predetermined criteria are not satisfied when the number or ratio of the evaluation data whose analysis result is not accurate among the analysis results of the learned recognition model for the evaluation data exceeds a predetermined threshold value.

The communication unit 27 may transmit an AI processing result by the AI processor 21 to an external electronic device.

Here, the external electronic device may be defined as an autonomous vehicle. Moreover, the AI device 20 may be defined as another vehicle or 5G network which communicates with the autonomous driving module vehicle. Meanwhile, the AI device 20 may be implemented to be functionally embedded in an autonomous driving module provided in the vehicle. In addition, the 5G network may include a server or a module which performs an autonomous driving related control.

Meanwhile, the AI device 20 shown in FIG. 4 is described to be functionally divided into the AI processor 21, the memory 25, the communication unit 27, or the like. However, note that the above-mentioned components may be integrated into one module and may be called as an AI module.

FIG. 6 shows a diagram illustrating an AI device associated with a device information providing device according to an embodiment of the present disclosure.

Referring to FIG. 6, the device information providing device 10 may transmit data requiring AI processing to the AI device 20 through the communication unit, and the AI device 20 including a deep learning model 26 may transmit an AI processing result using the deep learning model 26 to the device information providing device 10. The AI device 20 may refer to the contents described in FIG. 5.

The device information providing device 10 may include a wireless communication unit 210, an input unit 220, a memory 230, a power supply unit 240, an output unit 250, and a processor 260, and the processor 260 may further include an AI processor 261.

The memory 230 is electrically connected to the processor 260. The memory 230 may store basic data for the unit, control data for controlling the operation of the unit, and input/output data. The memory 230 may store data processed by the processor 260. The memory 230 may be configured in at least one of a ROM, a RAM, an EPROM, a flash drive, and a hard drive in hardware. The memory 230 may store various data for operations of the device information providing apparatus 10, such as a program for processing or controlling the processor 260. The memory 230 may be integrated with the processor 260. According to an embodiment, the memory 230 may be classified into sub-components of the processor 260.

The power supply unit 240 may supply power to the device information providing device 10. The power supply unit 240 may receive power from a power source (for example, a battery) included in the device information providing device 10, and supply power to each unit of the device information providing device 10. The power supply unit 240 may be operated according to a control signal provided from the main ECU 240. The power supply unit 240 may include a switched-mode power supply (SMPS).

The processor 260 may be electrically connected to the memory 230 and the power supply 240 to exchange signals. The processor 260 may include application specific integrated circuits (ASICs), digital signal processors (DSPs), digital signal processing devices (DSPDs), programmable logic devices (PLDs), field programmable gate arrays (FPGAs), processors, and controllers. And also may be implemented using at least one of controllers, micro-controllers, microprocessors, and electrical units for performing other functions.

The processor 260 may be driven by the power provided from the power supply 240. The processor 260 may receive data, process data, generate a signal, and provide a signal while the power is supplied by the power supply 240.

The processor 260 may receive information from another electronic device in the device information providing apparatus 10. The processor 260 may provide a control signal to another electronic device in the device information providing apparatus 10.

The device information providing apparatus 10 may include at least one printed circuit board (PCB). The memory 230, the interface unit, the power supply unit 240, and the processor 260 may be electrically connected to the printed circuit board.

Hereinafter, another electronic device and the AI processor 261 in the device information providing device connected to the interface unit will be described in more detail.

The device information providing device 10 may transmit photographed image information of each IoT device received from the device information acquisition device 40 to the AI device 20 through the communication unit 210, and by applying a neural network model 26 to the transferred data, the AI device 20 may transmit generated AI processing data to the device information providing device 10. The device information providing device 10 may recognize that each object is an IoT device based on the received AI processing data and display an object recognized as the IoT device on the display.

The communication unit 210 may exchange signals with a device located outside the device information providing apparatus 10. The communication unit 210 may exchange signals with at least one of an infrastructure (eg, a server, a broadcasting station), an IoT device, another device information providing device, and a terminal. The communication unit 210 may include at least one of a transmit antenna, a receive antenna, a radio frequency (RF) circuit capable of implementing various communication protocols, and an RF element to perform communication.

The AI processor 261 may generate information about a probability that each object is an IoT device using the image received from the device information acquisition device.

According to an embodiment of the present disclosure, the communication unit 210 may obtain a photographed image of each object from the device information acquisition device 40. The communication unit 210 may transmit the obtained photographed image of each object to the processor 260.

The wireless communication unit 210 may include one or more modules that enable wireless communication between an IoT device and a wireless communication system, between an IoT device and another IoT device, or between an IoT device and an external server. In addition, the wireless communication unit 210 may include one or more modules for connecting IoT devices to one or more networks.

The wireless communication unit 210 may include a mobile communication unit 211 and a short range communication unit 212 capable of transmitting and receiving data with an external IoT device or another external device (for example, an external server or a cloud).

The mobile communication unit 211 may include technical standards or communication schemes (eg, Global System for Mobile communication (GSM), Code Division Multi Access (CDMA), Code Division Multi Access 2000 (CDMA2000), and EV-DO). (Enhanced Voice-Data Optimized or Enhanced Voice-Data Only), Wideband CDMA (WCDMA), High Speed Downlink Packet Access (HSDPA), High Speed Uplink Packet Access (HSUPA), Long Term Evolution (LTE), Long LTE-A (Long-A) Term Evolution-Advanced) and transmits and receives a radio signal with at least one of a base station, an external terminal, and a server on a mobile communication network. The wireless signal may include various types of data according to transmission and reception of a voice call signal, a video call signal, or a text/multimedia message.

The short range communication unit 212 is for short range communication, and includes Bluetooth™, Radio Frequency Identification (RFID), Infrared Data Association (IrDA), Ultra Wideband (UWB), ZigBee, NFC (Near field communication may be supported using at least one of Near Field Communication (Wi-Fi), Wireless-Fidelity (Wi-Fi), Wi-Fi Direct, and Wireless Universal Serial Bus (Wireless USB) technologies. The short-range communication unit 212 may be configured between the IoT device 2 and the wireless communication system, between the IoT device 2 and another IoT device, or between the IoT device 2 and another IoT through a local area network. It can support wireless communication between networks where devices are located. The local area network may be local area network (Wireless Personal Area Networks).

The input unit 220 may include an interface for inputting audio information (or a signal), data, or information input from a user. The input unit 220 may include a microphone 221 for recognizing an external starter word.

The microphone 221 processes an external sound signal into electrical voice data. The processed voice data may be utilized in various ways depending on the function (or running application program) being performed on the IoT device. Meanwhile, various microphones for removing noise may be implemented in the microphone 221 to remove noise generated in the process of receiving an external sound signal.

The memory 230 stores data supporting various functions of the IoT device. The memory 170 may store a plurality of application programs or applications running in the IoT device, data for operating the IoT device, and instructions. At least some of these applications may be downloaded from an external server via wireless communication. In addition, at least some of these application programs may exist on the IoT device from the time of shipment for basic functions (for example, data reception and transmission functions) of the IoT device. Meanwhile, the application program may be stored in the memory 230 and installed on the IoT device 2 to be driven by the processor 260 to perform an operation (or function) of the IoT device.

The power supply unit 240 receives power from an external power source or an internal power source under the control of the processor 260 to supply power to each component included in the IoT device. The power supply unit 240 includes a battery, which may be a built-in battery or a replaceable battery.

The output unit 250 may include a sound output unit 261 that outputs an audio signal based on the control of the processor 260. The output unit 250 may include an alarm unit 262 that outputs a tactile signal based on the control of the processor 260.

FIG. 7 is a flowchart illustrating a method of providing device information according to an embodiment of the present disclosure.

As shown in FIG. 7, a method (S700) of providing device information of the device information providing device 10 according to an embodiment of the present disclosure may include steps S710, S730, and S750 and a detailed description thereof is as follows.

First, the device information providing device 10 may search for a control target device (IoT device) (S710).

Here, the processor 260 of the device information providing device 10 may search for a control target device among peripheral devices using the communication unit 210.

Thereafter, the device information providing device 10 may obtain a position of the control target device from a first external device (the device information acquisition device 40 or a robot cleaner) (S730).

Here, the processor 260 may obtain information related to a position of each control target device (IoT device) from the device information acquisition device 40 through the communication unit 210.

Here, the device information acquisition device 40 may travel within a home and photograph each object while traveling within the home.

For example, the device information acquisition device 40 may transmit a photographed image of each object to the device information providing device 10, and the device information providing device 10 may analyze the photographed image, determine whether an object included in the image is an IoT device, and transmit a determination result to the device information acquisition device 40. Therefore, the device information acquisition device 40 may detect a position of an object recognized as an IoT device among each object and transmit the position of the object recognized as an IoT device to the device information providing device 10.

In another example, the device information acquisition device 40 may request a control operation such as on/off of each control target device to the device information providing device 10, and the device information providing device 10 may transmit a control command of each control target device as a response thereof to the device information acquiring device 40. The device information acquisition device 40 may photograph a control result by the device information providing device 10 through the camera and determine whether each object is an IoT device based on the photographed image of the control result.

In the foregoing description, the device information providing device 10 determined whether each object is an IoT device, but the device information acquisition device 40 may identify each object using an artificial neural network generated through a learning process such as deep learning or machine learning.

Finally, the device information providing device 10 may display a position of the control target device on a map of an area in which the control target device is positioned (S750).

Here, the device information providing device 10 may include a display unit. The display unit may display an area (within a home) in which the control target device is positioned on a map and display a position of the control target device on the map under the control of the processor 260.

FIG. 8 illustrates an example in which a device information providing device displays a position of each IoT device.

As shown in FIG. 8, the device information providing device 10 may display a map within a home through the display unit 250.

When position information of each IoT device is transmitted from the device information acquisition device 40, the processor 260 of the device information providing device 10 controls the display unit 250 to display (21, 22, 23) position information of each IoT device positioned at a room of each home in the form of icons while displaying positions 251, 252, and 253 of a room in each home on the map.

For example, the device information providing device 10 may separately display a bulb 1 and a bulb 2, which are the same type of IoT device. For example, the device information providing device 10 may display an icon 21 including a name of the bulb 1 at an accurate position of a room 2, 252 in which the bulb 1 is positioned and simultaneously display an icon 22 including a name of the bulb 2 at an accurate position of the room 1, 251 in which the bulb 2 is positioned.

Thereby, the user may view a control target device list together with an accurate position on the map through an intuitive user interface displayed through the display unit 250.

FIG. 9 is a flowchart illustrating a method of recognizing an IoT device according to an embodiment of the present disclosure.

As shown in FIG. 9, the device information providing device 10 may extract a characteristic value from an object image transmitted from the device information acquisition device 40 (S910).

Here, the characteristic value may mean a characteristic vector value extracted on a feature map of an image of each object. For example, the characteristic value may include information related to DFT of each pixel included in the image feature map of each object.

Thereafter, the device information providing device 10 may input the characteristic value to the previously learned artificial neural network (S920).

Here, the artificial neural network may output a probability that a corresponding object is an IoT device as a numerical value using a characteristic value of the image of each object as an input.

Thereafter, the device information providing device 10 may determine whether the object is an IoT device from an output of the artificial neural network (S930).

For example, when the artificial neural network outputs a probability that the object is an IoT device based on the characteristic value of the image of each object, the processor 260 of the device providing information device 10 may determine whether each object is an IoT device based on a probability.

For example, if a probability that each object is an IoT device is equal to or larger than a predetermined threshold value (e.g., 80%), the processor 260 may determine that the object is an IoT device.

Alternatively, if a probability that each object is an IoT device is less than a predetermined threshold value, the processor 260 may determine that the object is not an IoT device.

When it is recognized that the object is an IoT device, the processor 260 may transmit information notifying that the object is an IoT device to the device information acquisition device 40 through the communication unit 220, and the device information acquisition device 40 may detect a position of the object to transmit the position to the device information providing device 10.

FIG. 10 is a block diagram of a device information obtaining apparatus (robot device) according to an embodiment of the present disclosure.

The mobile robot 100 having a 3D sensing system and including a 3D Depth sensor, an RGB camera, and an Odometry (a wheel encoder, a gyro sensor, etc.) capable of estimating a mileage can be freely moved in a space within an area. It may be defined as a mobile robot (100).

The robot 100 automatically extracts three-dimensional point data of the environment in the area and continuously generates/updates a map of the location and the surrounding environment of the robot 100 in real time. This feature is called 3D Simultaneous Localization And Mapping (SLAM). As a result of the 3D SLAM, we can obtain the map information in the area and the 3D point data of the real environment. The SW module extracts the outer wall surface of the environment in the area by processing the 3D point data obtained from the 3D SLAM. An area classification SW module in the area based on the outer wall structure may be mounted in the robot 100.

Referring to FIG. 10, the robot 100 according to an embodiment of the present disclosure may include a processor 110, a power supply unit 120, a communication unit 130, a driving driver 140, a user input unit 150, The object recognition unit 160, the location recognition unit 170, the obstacle recognition unit 180, and the interface unit 190 may be included.

The processor 110 manages the power supply unit 120 including a battery, the obstacle recognition unit 180 including various sensors, and the driving driver 140 including a plurality of motors and wheels, among the hardware of the robot. It may include a microcomputer.

In addition, the processor 110 may include an application processor (AP) that performs a function of managing the entire hardware module system of the robot. The AP transmits an application program for driving and user input/output information to the microcomputer by using the location information acquired through various sensors to drive the motor. In addition, the user input unit 150, the object recognition unit 160, the location recognition unit 170, and the like may be managed by the AP.

In addition, the processor 110 may include an AI processor 111. The AI processor 21 may learn a neural network using a program stored in a memory. In particular, the AI processor 21 may learn a neural network for recognizing data around the robot. Here, the neural network may include a deep learning model developed from the neural network model. In the deep learning model, a plurality of network nodes may be located at different layers and exchange data according to a convolutional connection relationship. Examples of neural network models include deep neural networks (DNNs), convolutional deep neural networks (CNNs), recurrent boltzmann machines (RNNs), restricted boltzmann machines (RBMs), and deep confidence It includes various deep learning techniques such as DBN (deep belief networks) and deep Q-network, and can be applied to fields such as computer vision, speech recognition, natural language processing, and voice/signal processing.

The robot may implement at least one function of object recognition, location recognition, obstacle recognition, and/or drive control by applying a deep learning model through the AI processor 111. In addition, the robot may implement the at least one function described above by receiving an AI processing result from an external server through a communication unit.

The power supply unit 120 may include a battery driver and a lithium ion battery. The battery driver can manage the charge and discharge of lithium-ion batteries. The lithium-ion battery may supply power for driving the robot. The lithium-ion battery 122 may be configured by connecting two 24V/102A lithium-ion batteries in parallel.

The communication unit 130 may receive a signal/data from an external input, as well as tune a wireless communication module (not shown) or a broadcast signal for wireless communication according to a design method of the robot 100. It may further include various additional configurations, such as a tuner (not shown). In addition to receiving a signal from an external device, the communication unit 130 may transmit information/data/signal of the robot 100 to the external device. That is, the communication unit 130 may not be limited only to a configuration for receiving a signal from an external device, but may be implemented as an interface capable of bidirectional communication. The communication unit 130 may receive a control signal for selecting a UI from the plurality of control devices. The communication unit 130 is composed of a communication module for short-range wireless communication such as wireless LAN (WiFi), Bluetooth (Bluetooth), IR (Infrared), UWB (Ultra Wideband), Zigbee (Zigbee), or 3G, 4G, LTE, 5G, etc. may be configured as a mobile communication module, it may be configured as a known communication port for wired communication. The communicator 130 may be used for various purposes, such as a command for manipulating a display, transmitting and receiving data, in addition to a control signal for selecting a UI.

The driving driver 140 may include a wheel motor 142 and a rotation motor 143. The wheel motor 142 may drive a plurality of wheels for driving of the robot. The rotary motor 143 may be driven for left and right rotation and up and down rotation of the main body of the robot or the head of the robot, or may be driven to change the direction or rotate the wheels of the robot.

Meanwhile, in the case of a robot programmed to perform a specific function, an additional function of a driving driver for performing the specific function may be provided. For example, the cleaning robot may further include a main brush motor, a side brush motor, and a suction motor.

In addition, for example, when a driving assistance function of an autonomous vehicle is programmed to be performed, a function of monitoring a driver and a passenger by docking in a specific area inside the vehicle, and providing a predetermined service to the passenger Function, a function of managing the inside of the vehicle, and the like.

For example, when mounted in a specific area inside the vehicle, the vehicle may provide a driving control signal in an autonomous driving mode or perform a function as an auxiliary device for V2X data communication.

Further, for example, the autonomous vehicle may interact with the robot outside of the vehicle to perform a function of controlling the movement path of the robot in connection with driving of the vehicle.

The user input unit 150 transmits various preset control commands or information to the processor 110 according to a user's manipulation and input. The user input unit 150 may be implemented as a menu key or an input panel installed outside the display device, or a remote controller separated from the robot 100. Alternatively, the user input unit 150 may be integrated with a display unit (not shown). When the display unit is a touch screen, the user touches an input menu (not shown) displayed on the display unit. The preset command may be transmitted to the processor 110.

The user input unit 150 may detect a gesture of a user through a sensor detecting an area and transmit a user's command to the processor 110, and transmit a user's voice command to the processor 110. You can also perform setup.

The object recognition unit 160 may include a 2D camera 161 and an RGBD camera 162. The 2D camera 161 may be a sensor for recognizing a person or an object based on the 2D image. RGBD cameras (Red, Green, Blue, Distance, 162) are used to detect a person or object using captured images having depth data obtained from a camera with RGBD sensors or other similar 3D imaging devices. It may be a sensor.

The location recognizer 170 may include a rider Lidar 171 and a SLAM camera 172. The SLAM camera (Simultaneous Localization And Mapping camera, 172) can implement simultaneous location tracking and mapping technology. The robot may detect the surrounding environment information using the SLAM camera 172 and process the obtained information to prepare a map corresponding to the mission execution space and estimate its absolute position. The rider (Light Detection and Ranging: Lidar) 171 is a laser radar, and may be a sensor that irradiates a laser beam and collects and analyzes backscattered light among light absorbed or scattered by an aerosol to perform position recognition. The position recognition unit 170 may process and process the sensing data collected from the rider 171, the SLAM camera 172, and the like to perform data management for position recognition and obstacle recognition of the robot.

The obstacle recognition unit 180 may include an IR remote controller receiver 181, a USS 182, a Cliff PSD 183, an ARS 184, a Bumper 185, and an OFS 186. The IR remote control receiver 181 may include a sensor that transmits a signal of an infrared (IR) remote controller for remotely controlling the robot. The USS (Ultrasonic sensor) 182 may include a sensor for determining the distance between the obstacle and the robot using an ultrasonic signal. The Cliff PSD 183 may include a sensor for detecting a cliff or a cliff in a robot driving range of 360 degrees in all directions. Attitude Reference System (ARS) 184 may include a sensor for detecting the attitude of the robot. The ARS 184 may include a sensor composed of three axes of acceleration and three axes of gyro for detecting an amount of rotation of the robot. Bumper 185 may include a sensor for detecting a collision between the robot and the obstacle. The sensor included in the bumper 185 may detect a collision between the robot and the obstacle in a 360 degree range. OFS (Optical Flow Sensor) 186 may include a sensor that can measure the traveling distance of the robot on various floors and the phenomenon of turning the wheel while driving the robot.

Meanwhile, in FIG. 10, the robot device which is movable on the ground has been described as a reference, but the present disclosure is not limited thereto. For example, the robot device described in one embodiment of the present disclosure may include an unmanned aerial vehicle (UAV, Uninhabited aerial vehicle), such as a drone, the configuration related to the operation of the unmanned aerial vehicle is a flight state Sensors for sensing the rotational motion state and the translational motion state that are defined may be added.

It will be apparent to those skilled in the art that the robot 100 described above with reference to FIG. 10 may perform a function of the device information acquisition device 40 described with reference to FIGS. 4 through 9.

Embodiment 1

A method of providing information related to a control target device includes searching for the control target device; and displaying information related to the found control target device, wherein the information related to the control target device includes a position of the control target device in a map of an area in which the control target device is positioned.

Embodiment 2

In Embodiment 1, the displaying of information includes obtaining a map of an area in which the control target device is positioned and a position of the control target device from an external device.

Embodiment 3

In Embodiment 2, the displaying of information includes determining whether an object is a control target device; and requesting, if an object is a control target device, information related to a position of the object to the external device.

Embodiment 4 in Embodiment 3, the determining of whether an object is a control target device includes transmitting a reference control signal to the object; obtaining information related to a response result of the object, having received the reference control signal from the external device; and determining whether the object is the control target device based on the response result.

Embodiment 5

In Embodiment 4, the reference control signal includes a control signal that controls to turn on/off the control target device.

Embodiment 6 in Embodiment 3, the determining of whether an object is a control target device includes obtaining a photographed image of the object from the external device; and determining whether the object is the control target device based on the photographed image of the object.

Embodiment 7 in Embodiment 6, the method further includes extracting a characteristic value from the photographed image of the object; inputting the characteristic value to a previously learned artificial neural network; obtaining a probability that the object is the control target device from the previously learned artificial neural network; and determining whether the object is the control target device based on the probability.

Embodiment 8 in Embodiment 2, the method further includes receiving Downlink Control Information (DCI) used for scheduling reception of a position of the control target device from the network, and receiving a position of the control target device from an external device through the network based on the DCI.

Embodiment 9 in Embodiment 8, the method further includes performing an initial access procedure to the network based on a synchronization signal block (SSB), and receiving a position of the control target device from the external device through a Physical Uplink Shared Channel (PUSCH) and the network, wherein a DM-RS of the PUSCH and the SSB is quasi co-located (QCL) for QCL type D.

Embodiment 10 in Embodiment 8, the method further includes controlling a communication unit to transmit a photographed image of an object to an AI processor included in the network, and controlling the communication unit to receive AI processed information from the AI processor, wherein the AI processed information is a probability that the photographed object is the control target device.

Embodiment 11

A device information providing device for providing information related to the control target device includes a display unit; a communication unit for searching for the control target device; and a processor for displaying information related to the found control target device through the display unit, wherein the information related to the control target device includes a position of the control target device in a map of an area in which the control target device is positioned.

Embodiment 12 in Embodiment 11, the processor obtains a map of an area in which the control target device is positioned and a position of the control target device from an external device.

Embodiment 13 in Embodiment 12, the processor determines whether an object is a control target device, and if an object is a control target device, the processor requests information related to a position of the object to the external device.

Embodiment 14 in Embodiment 13, when determining whether the object is a control target device, the processor transmits a reference control signal to the object, obtains information related to a response result of the object, having received the reference control signal from the external device, and determines whether the object is the control target device based on the response result.

Embodiment 15

In Embodiment 14, the reference control signal includes a control signal that controls to turn on/off the control target device.

Embodiment 16

In Embodiment 13, when determining whether the object is a control target device, the processor obtains a photographed image of the object from the external device, and determines whether the object is the control target device based on the photographed image of the object.

Embodiment 17

In Embodiment 16, the processor extracts a characteristic value from the photographed image of the object, inputs the characteristic value to a previously learned artificial neural network, obtains a probability that the object is the control target device from the previously learned artificial neural network, and determines whether the object is the control target device based on the probability.

Embodiment 18

In Embodiment 12, the processor controls the communication unit to receive Downlink Control Information (DCI) used for scheduling reception of a position of the control target device from the network and to receive a position of the control target device from an external device through the network based on the DCI.

Embodiment 19 in Embodiment 18, the processor controls the communication unit to perform an initial access procedure to the network based on synchronization signal block (SSB) and to receive a position of the control target device from the external device through a PUSCH and the network, wherein a DM-RS of the PUSCH and the SSB is QCL for QCL type D.

Embodiment 20

In Embodiment 18, the processor controls the communication unit to transmit a photographed image of an object to an AI processor included in the network and to receive AI processed information from the AI processor, wherein the AI processed information is a probability that the photographed object is the control target device.

Embodiment 21

A non-transient computer readable recording medium is a non-transitory computer-executable component that stores a computer executable component configured to execute in at least one processor of a computing device, searches for a control target device and displays information related to the found control target device, and the information related to the control target device includes a position of the control target device in a map of an area in which the control target device is positioned.

The present disclosure described above can be embodied as computer readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like. This also includes implementations in the form of carrier waves (eg, transmission over the Internet). Accordingly, the above detailed description should not be construed as limiting in all aspects and should be considered as illustrative. The scope of the disclosure should be determined by reasonable interpretation of the appended claims, and all changes within the equivalent scope of the disclosure are included in the scope of the disclosure.

Effects of a method and device for providing IoT device information and an intelligent computing device according to an embodiment of the present disclosure are as follows.

According to the present disclosure, by obtaining a position of an IoT device positioned within a home through a robot cleaner that may move itself among IoT devices, an intuitive interface can be provided to a user.

Further, according to the present disclosure, when the same kind of several IoT devices such as interior light exist in a home, a position of each IoT device can be accurately transferred and thus a user's confusion can be prevented.

The effects obtained in the present disclosure are not limited to the above-mentioned effects, and other effects not mentioned above will be clearly understood by those skilled in the art from the following description.

What is claimed is:
1. A method, comprising:
   searching to find a control target device;
   determining whether an object found during the searching is the control target device;
   requesting an external device to provide first data associated with a position of the control target device, based on the object being determined to be the control target device;

obtaining, from the external device, the first data and second data associated with a map of an area which the control target device is positioned;
displaying the map of the area based on the second data; and
displaying the position of the control target device within the map based on the first data,
wherein the determining whether the object is the control target device comprises: transmitting a control signal to the object;
receiving, through the external device, information about a response of the object to the control signal; and
determining whether the object is the control target device based on the received information;
wherein the determining whether the object is the control target device comprises:
receiving a photographed image of the object from the external device;
determining whether the object is the control target device based on the photographed image of the object;
extracting a characteristic value from the photographed image of the object;
inputting the characteristic value to a previously learned artificial neural network; and
obtaining a probability that the object is the control target device from the previously learned artificial neural network; and
determining whether the object is the control target device based on the probability.

2. The method of claim 1, wherein the control signal comprises an on/off control signal.

3. The method of claim 1 further comprising:
receiving, from a network, Downlink Control Information (DCI) used for scheduling reception of the first data associated with the position of the control target device; and
receiving the first data associated with the position of the control target device from the external device through the network based on the DCI.

4. The method of claim 3, further comprising:
performing an initial access procedure to the network based on a synchronization signal block (SSB); and
receiving the first data associated with the position of the control target device from the external device through a Physical Uplink Shared Channel (PUSCH) of the network,
wherein a demodulation reference signal (DM-RS) of the PUSCH and the SSB is quasi co-located (QCL) for QCL type D.

5. The method of claim 3, further comprising:
controlling a transceiver to transmit a photographed image of the object to an AI processor included in the network; and
controlling the transceiver to receive AI processed information from the AI processor,
wherein the AI processed information is a probability that the photographed object is the control target device.

6. The method of claim 1, wherein the external device is a mobile robot which travels the area while obtaining the first and second data.

7. A device, comprising:
a display;
a transceiver; and
a processor coupled to the display and the transceiver, wherein the processor is configured to:
search, using the transceiver, to find a control target device;
determining whether an object found during the searching is the control target device;
request, using the transceiver, an external device to provide first data associated with a position of the control target device, based on the object being determined to be the control target device;
obtain, using the transceiver, from the external device, the first data and second data associated with a map of an area which the control target device is positioned;
cause the display to display the map of the area based on the second data; and
cause the display to display the position of the control target device within the map based on the first data,
wherein the processor is further configured to:
transmit, using the transceiver, a control signal to the object;
receive, using the transceiver, information about a response of the object to the control signal, through the external device;
determine whether the object is the control target device based on the received information;
wherein the determine whether the object is the control target device comprises:
receive, via the transceiver, a photographed image of the object from the external device;
determine whether the object is the control target device based on the photographed image of the object;
extract, using the transceiver, a characteristic value from the photographed image of the object;
input, using the transceiver, the characteristic value to a previously learned artificial neural network;
obtain, using the transceiver, a probability that the object is the control target device from the previously learned artificial neural network; and
determine whether the object is the control target device based on the probability.

8. The device of claim 7, wherein the reference control signal comprises an on/off control signal.

9. The device of claim 7, wherein the processor is further configured to:
receive, via the transceiver from a network, Downlink Control Information (DCI) used for scheduling reception of the first data associated with the position of the control target device; and
receive, via the transceiver, the first data associated with the position of the control target device from the external device through the network based on the DCI.

10. The device of claim 9, wherein the processor is further configured to:
perform an initial access procedure to the network based on a synchronization signal block (SSB); and
receive, via the transceiver, the first data associated with the position of the control target device from the external device through a Physical Uplink Shared Channel (PUSCH) of the network,
wherein a demodulation reference signal (DM-RS) of the PUSCH and the SSB is quasi co-located (QCL) for QCL type D.

11. The device of claim 9, wherein the processor is further configured to:
cause the transceiver to transmit a photographed image of the object to an AI processor included in the network; and
cause the transceiver to receive AI processed information from the AI processor, wherein the AI processed information is a probability that the photographed object is the control target device.

12. The device of claim 7, wherein the external device is a mobile robot which travels the area while obtaining the first and second data.

* * * * *